(12) United States Patent
Votolato (10) Patent No.: US 10,244,899 B2
(45) Date of Patent: Apr. 2, 2019

(54) DISPOSABLE COVERS FOR HOT HANDLES

(71) Applicant: Spellbound Development Group, Inc., Newport Beach, CA (US)

(72) Inventor: Earl Votolato, Newport Beach, CA (US)

(73) Assignee: Spellbound Development Group, Inc., Newport Beach, CA (US)

(*) Notice: Subject to any disclaimer, the term of this patent is extended or adjusted under 35 U.S.C. 154(b) by 0 days.

(21) Appl. No.: 15/428,463

(22) Filed: Feb. 9, 2017

(65) Prior Publication Data

US 2018/0220849 A1    Aug. 9, 2018

(51) Int. Cl.
*B25G 1/10* (2006.01)
*A47J 45/08* (2006.01)
*A47J 45/06* (2006.01)

(52) U.S. Cl.
CPC ........... *A47J 45/085* (2013.01); *A47J 45/061* (2013.01)

(58) Field of Classification Search
CPC ..... Y10T 16/495; Y10T 16/48; Y10T 16/466; Y10T 16/469; A47J 45/08; A47J 45/085; A47J 45/10; A47J 45/061; B62B 5/069; B25F 5/006; B65D 81/3876; B65D 81/3886
USPC .................. 401/6, 8; 220/738, 739
See application file for complete search history.

(56) References Cited

U.S. PATENT DOCUMENTS

| 689,778 | A | 12/1901 | Barnard |
| 830,016 | A | 9/1906 | Sims |
| 1,096,204 | A | 5/1914 | Taggart |
| 1,337,592 | A | 4/1920 | Clenny et al. |
| 1,501,020 | A | 7/1924 | Small |
| 1,747,097 | A | 2/1930 | Young |
| 2,436,507 | A | 2/1948 | Ellwood |
| 2,609,563 | A | 9/1952 | Budelman |
| 3,072,955 | A * | 1/1963 | Mitchell ................... A45F 5/10 16/411 |
| 3,858,320 | A | 1/1975 | Neal et al. |
| 4,103,420 | A | 8/1978 | Davis |
| 4,197,611 | A * | 4/1980 | Bell ........................ A47J 45/08 16/DIG. 12 |
| 4,201,795 | A * | 5/1980 | Yamanaka ......... B65D 81/3407 206/216 |
| 4,209,877 | A | 7/1980 | Colasent |
| 4,398,650 | A | 8/1983 | Holmes et al. |

(Continued)

FOREIGN PATENT DOCUMENTS

CN    204671002 U    9/2015

OTHER PUBLICATIONS

Amazon.com, search of Splatter Screens, screen capture Jan. 24, 2017.

(Continued)

*Primary Examiner* — Chuck Y Mah
(74) *Attorney, Agent, or Firm* — Fish IP Law, LLP (57) ABSTRACT

The inventive subject matter provides apparatus, systems and methods for a low-cost, disposable protective cover for handles and other objects. The disposable cover can include a flexible tube having first and second ends, an inner surface and an outer surface. One or more layers of the tube will preferably include corrugations, ridges, bumps or other non-smooth surface such that air spaces are formed between the handle and the inner surface, or the inner surface and the outer surface.

11 Claims, 12 Drawing Sheets

(56) References Cited

U.S. PATENT DOCUMENTS

| | | | | |
|---|---|---|---|---|
| 4,873,742 | A * | 10/1989 | Dillon | B25B 13/461 16/421 |
| 5,056,945 | A * | 10/1991 | Klodt | B43K 23/008 401/6 |
| 5,134,008 | A * | 7/1992 | Alm | B25G 1/10 16/DIG. 12 |
| 5,165,143 | A * | 11/1992 | Detchon | A47L 13/42 16/421 |
| 5,429,377 | A * | 7/1995 | Duer | B62B 5/06 150/154 |
| 5,469,601 | A * | 11/1995 | Jackson | A47J 45/10 16/421 |
| 5,511,445 | A * | 4/1996 | Hildebrandt | B25G 1/01 16/421 |
| 5,584,414 | A | 12/1996 | Neubeck | |
| 5,890,260 | A * | 4/1999 | Gaunt | B25G 1/10 16/436 |
| 5,933,870 | A * | 8/1999 | Egan, Jr. | A42B 1/24 138/178 |
| 6,170,694 | B1 | 1/2001 | Munari | |
| 6,206,855 | B1 | 3/2001 | Kunkel et al. | |
| 6,234,924 | B1 * | 5/2001 | Washburn, Jr. | A63B 60/10 473/457 |
| 6,546,594 | B1 * | 4/2003 | Wills | E05B 1/0069 16/412 |
| 7,011,003 | B1 | 3/2006 | Berke | |
| 7,669,291 | B1 * | 3/2010 | Blum | A47J 45/10 16/425 |
| 8,304,004 | B2 | 11/2012 | Sanders | |
| 8,800,112 | B1 * | 8/2014 | Douglas | A47J 45/10 16/421 |
| 9,095,971 | B1 * | 8/2015 | Douglas | A47J 45/10 |
| 9,521,931 | B2 | 12/2016 | Ho | |
| 2003/0111475 | A1 * | 6/2003 | Cheng | B65D 81/3876 220/739 |
| 2003/0135954 | A1 * | 7/2003 | Beckwith | A45C 13/26 16/422 |
| 2004/0057772 | A1 * | 3/2004 | Pearce | A46B 5/026 401/6 |
| 2005/0056654 | A1 * | 3/2005 | Leung | B65D 81/3876 220/737 |
| 2005/0177983 | A1 * | 8/2005 | Holms | A45F 5/10 16/435 |
| 2007/0262129 | A1 | 11/2007 | Zadravetz | |
| 2008/0289148 | A1 * | 11/2008 | Summerfield | A45F 5/102 16/421 |
| 2011/0210165 | A1 | 9/2011 | Stepanek, Jr. | |
| 2013/0043261 | A1 | 2/2013 | Barton | |
| 2013/0098930 | A1 | 4/2013 | Ong | |
| 2015/0182071 | A1 * | 7/2015 | Charpentier | A47J 36/34 248/346.01 |
| 2016/0135629 | A1 * | 5/2016 | Robertson | A47G 23/0216 220/739 |

OTHER PUBLICATIONS

Conrugated Handle Holderes, https://www.aliexpress.com/item/2pcs-Heat-Resistant-Silicone-Pot-Pan-...2, screen capture Jan. 9, 2017.

* cited by examiner

DISPOSABLE COVERS FOR HOT HANDLES

FIELD OF THE INVENTION

The field of the invention is disposable protective covers, especially disposable safety sleeves for hot equipment handles.

BACKGROUND

The following description includes information that may be useful in understanding the present invention. It is not an admission that any of the information provided herein is prior art or relevant to the presently claimed invention, or that any publication specifically or implicitly referenced is prior art.

Many injuries in the service industry, and in manufacturing and laboratory environments, relate to burns or spills resulting from improper handling of hot handles. In some instances, a user is simply unaware of the handle temperature prior to grabbing the handle, which can lead to burns, spills and other injuries. In some other instances, the user does not have a holder handy at the time a pan needs to be removed from the heat.

Various efforts have been made to thermally protect users from burns and other injuries when handling cookware and other objects having hot handles or other portions. Such efforts include potholders and mitts, as well as handle covers made from cotton or silicone. Some other efforts have been made to protect handles and the user's hands from grease, chemical and food splatter, which include splatter screens that are generally circular and fit over an opening of a device.

Unfortunately, many of the known protective devices are unsanitary due to constant re-use and splatter resulting in cross-contamination issues and other challenges. Additionally, many known protective devices are not adjustable in size to allow users to firmly grip handle covers of different sizes. Still further, many protective devices are not configured to thermally protect a user's hands or other body portion from hot objects.

Thus, there is still a need for improved protective covers for handles.

SUMMARY OF THE INVENTION

The inventive subject matter provides apparatus, systems and methods for a low-cost, disposable protective cover for handles and other objects.

In some aspects, the disposable protective cover is provided for hot handles (e.g., cookware handles, handles for lab equipment), and includes a flexible tube having first and second ends, an inner surface and an outer surface. The flexible tube is sized and dimensioned to snugly receive the handle portion of the cooking device, and to protect the user's hands from burns and other injuries, as well as from food and oil splatter. For example, the flexible tube could have a diameter or width of between 0.5-3 inches, between 1-2 inches, between 0.5-1.5 inches, or between 0.5-2.5 inches. Additionally, the flexible tube could have a length of between 2-8 inches, between 4-7 inches, between 2-5 inches, or between 5-7 inches.

As used herein, the term "tube" should be interpreted broadly to include any generally tubular object having one or two open ends. The tube could have any suitable cross-sectional shape, including for example, a circle, an oval, a square, a triangle, a pentagon, or a hexagon.

In order to provide thermal insulation, the tube can advantageously include air spaces (e.g., corrugations, creping, bumps, notches, protrusions, embossed or debossed portions) that provide air pockets or air spaces that reduce heat transmission between the inner and outer surfaces. For example, the inner surface, the outer surface, or a portion of the tube extending between the inner and outer surfaces (a mid-layer) can include corrugations, creping, bumps, ridges, lumps, projections, indentations, or other non-smooth surface such that air spaces are created between at least one of the handle and the inner surface of the cover, and between the inner and outer surfaces of the cover.

In some preferred aspects, the disposable protective cover is made in part (e.g., at least 50%, at least 75%) or entirely from a paper material such as paperboard, preferably a paper material having sufficient stiffness and rigidity to maintain the air spaces of the cover during use. However, contemplated disposable protective covers can additionally or alternatively be made from a plastic, silicone, fabric, rubber, adhesives, or any other suitable material or combinations of materials.

The inventive subject matter also provides a length of safety sleeves including a plurality of safety sleeves that can be separated by perforations. Where the safety sleeves are pre-formed tubes, the user could simply tear off each safety sleeve prior to use. Where the safety sleeves are provided as flat sheets, the user could tear off a sheet portion corresponding to a safety sleeve, roll the sheet to form a tube, and adhere overlapping sides of the sheet together via an adhesive, male and female flutes or any other suitable mechanism.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIGS. 10A-18D illustrate exemplary tube materials of the inventive subject matter.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

In FIGS. 1A-1H, a disposable protective cover 100 for hot pan handles or other objects is provided. Cover 100 includes an outer surface 110a, inner surface 110b, first end 120a, and second end 120b. Two tear lines 130a and 130b are provided, which allows a user to flare or flip up an end portion of the cover to form a flared splatter shield 150. As shown in FIGS. 1E-1H, cover 100 could be used as a sleeve for cookware handles with or without splatter shield 150.

Figure 1A:
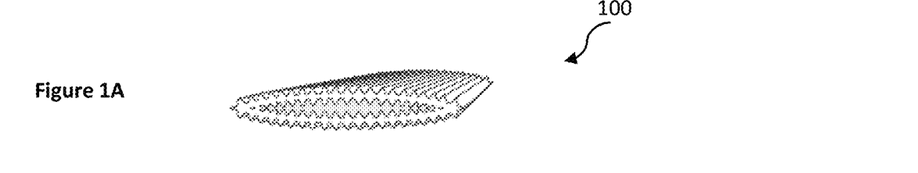
FIGS. 1A-1H illustrate a disposable protective cover of the inventive subject matter.
Figure 1B:
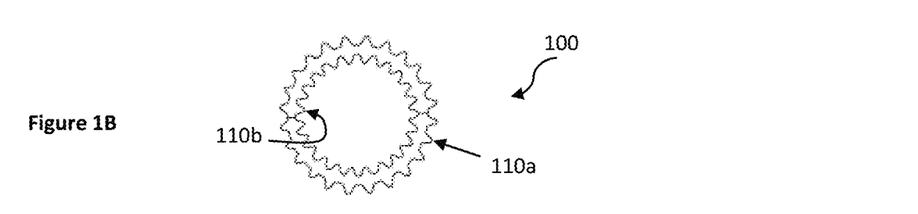
Figure 1C:
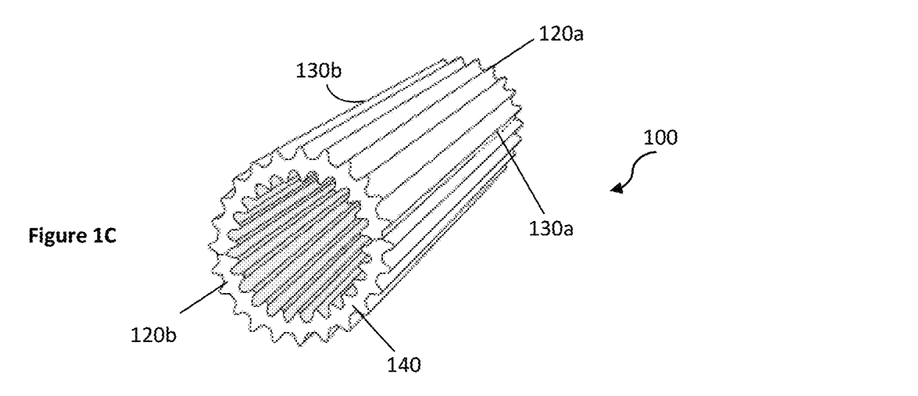
Figure 1D:
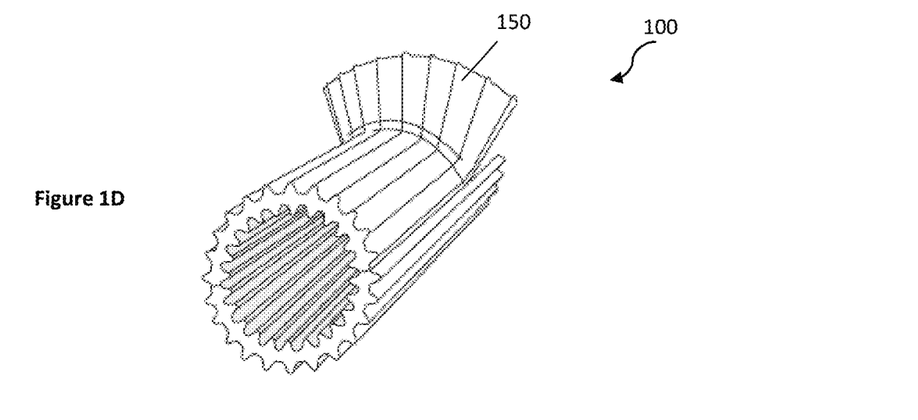
Figure 1E:
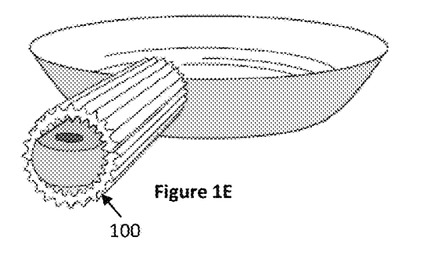
Figure 1F:
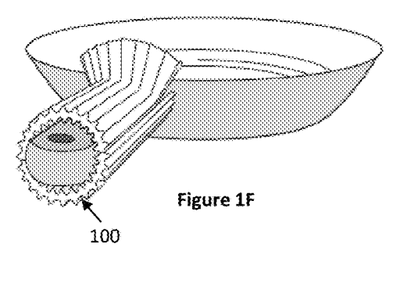
Figure 1G:
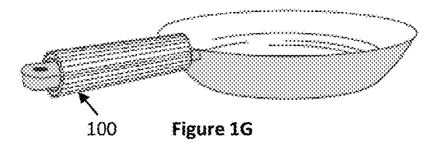
Figure 1H:
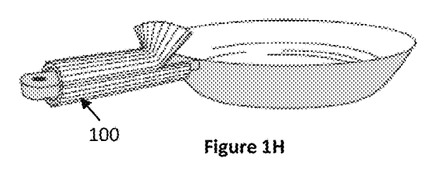

FIG. 1A illustrates cover 100 in a configuration generally preferred for shipping and storing. Cover 100 can optionally include thinned portions (e.g., portions lacking a corrugated surface, portions with score lines) that allow cover 100 to more readily be collapsed into a flatter shape. FIGS. 1B-1D illustrates cover 100 in a configuration suitable for use with a handle or other object. Cover 100 includes an opening sized and dimensioned to receive at least a portion of a handle, and is preferably sized and dimensioned to cover a portion of the handle the user would typically grab. In the embodiment shown, cover 100 comprises a single layer of a paperboard material having entirely corrugated outer and inner surfaces 110a and 110b, respectively. In some other contemplated embodiments, the cover could comprise two or more layers of material, and one or more of the layers could be corrugated. Additionally, the one or more layers could each be entirely corrugated or can be partially corrugated (e.g., at least 40%, at least 50%, at least 60%, at least 70%, at least 80%, at least 90% of the layer can be corrugated or otherwise uneven).

The tear lines 130a and 130b could be spaced apart and of sufficient lengths such that splatter shield 150 formed is sized and dimensioned to prevent oil or food splatter from contacting the handle or remaining portion of cover 100. For example, the tear lines 130a and 130b could be positioned between 75-180 degrees apart, more preferably between 90-180 degrees apart, and even more preferably between 90-150 degrees apart. Viewed from a different perspective, tear lines 130a and 130b can be spaced apart by at least 0.5 inch, at least 0.75 inch, or even an inch or more. Additionally, tear lines could extend along any suitable percentage of the length of cover 100 (e.g., at least 10%, at least 20%, at least 25%, between 10-40%, between 10-30%, between 20-40%). Viewed from a different perspective, tear lines could be at least 0.5 inch, at least 1 inch, at least 1.5 inch or even 2 inches or longer. Cover 100 could optionally include a thinned portion that extends between the tear lines 130a and 130b, which more readily allows cover 100 to bend to form shield 150. Shield 150 will preferably extend substantially orthogonally from a non-bent portion of cover 100 and form an angle of between 60-120 degrees or between 75-105 degrees.

While the description herein is generally directed to covers including two perforated tear lines that can be used to form a shield, it should be appreciated that any suitable number of tear lines can be included such that, for example, the user could select a size of the shield.

It should also be appreciated that cover 100 could include a flared, continuous, skirt-like tube such that the user's hands are protected from splatter burns without any need to tear along perforated surfaces. For example, first end 110a could have a diameter or width that is at least ±5%, at least ±10%, at least ±15%, at least ±20%, or even at least ±25% the diameter or width of second end 120b.

Figure 2A:
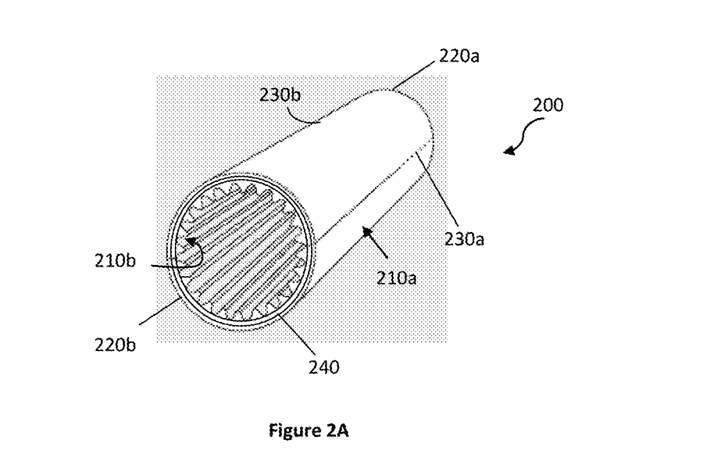
FIG. 2A illustrates another disposable protective cover having a smooth outer surface.

FIG. 2A illustrates another cover 200, which includes a first end 220a, second end 220b, outer surface 210a, inner surface 210b, mid-portion or mid-layer 240, and tear lines 230a and 230b. Unlike cover 100, cover 200 comprises multiple layers of material, only some of which are corrugated. The outer layer comprises a smooth outer surface 210a, while the inner layer comprises a corrugated inner surface 210b that provides for a greater grip between cover 200 and the cookware handle or other object. Additionally or alternatively, the grip between the inner surface and handle could be enhanced with a non-skid or other coating, gripping tabs, or any other suitable means. Still further, the outer surface could include a coating or tab for gripping or decorative purposes as further described below.

The mid-layer or mid-layers could additionally be corrugated to provide even more air spaces and thermal insulation. In some contemplated embodiments, a multi-layered cover can include alternating layers of corrugated material and column material (non-corrugated material) that provide multiple layers of air columns or flutes throughout the cover. For example, contemplated covers can be single wall, double wall, or triple wall configurations, and can have flute sizes of between 1/16-3/16 of an inch.

In some preferred embodiments, cover 200 will have a thickness between outer and inner surfaces that is suitable to protect the user's hand without unnecessarily taking up space during storage, shipping and use. For example, cover 200 could have a first thickness of between 1-10 mm, between 1-8 mm, between 2-8 mm, between 3-6 mm, or any other suitable thickness. Where an outer or inner surface includes corrugations or other non-smooth areas, cover 200 could have a second thickness that is greater than the first thickness (e.g., between 5-20 mm, between 5-16 mm) or less than the first thickness (e.g., between 1-8 mm, between 1-6 mm). The cover will preferably have an edge crush test (ECT) value sufficient to resist crushing when grabbed by a user with the cookware handle. For example, the cover can have an ECT value of between 23-100 pounds per inch.

One or more of the surfaces can optionally include decorative features such as colors, images, logos, labels, text, graphics, and advertisements. It is generally preferred that the decorative features are printed or otherwise incorporated on smoother surfaces, where available. For example, the decorative features could be printed on a non-corrugated sheet and incorporated into the cover as an outer layer or portion thereof.

Additionally or alternatively, some or all of the layers could be made of a fire resistant material or coating that can withstand extreme temperatures for a short or extended amount of time. For example, some contemplated materials and coatings can withstand temperatures of up to 100° F., up to 200° F., up to 300° F., up to 400° F., up to 800° F., up to 1000° F. or even higher temperatures for at least 5 minutes, at least 10 minutes, at least 20 minutes, at least 30 minutes, and even up to 60 minutes or longer periods of time without at least one of burning, charring or delaminating. Such materials and coatings are especially advantageous where a handle cover is used on cookware that is positioned on or near an open flame or other heating element.

Figure 2B:
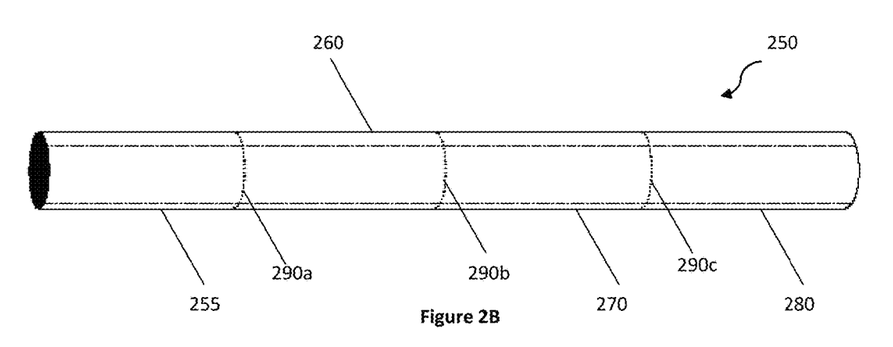
FIG. 2B illustrates a tube of disposable covers separated by tear lines.
Figure 3A:
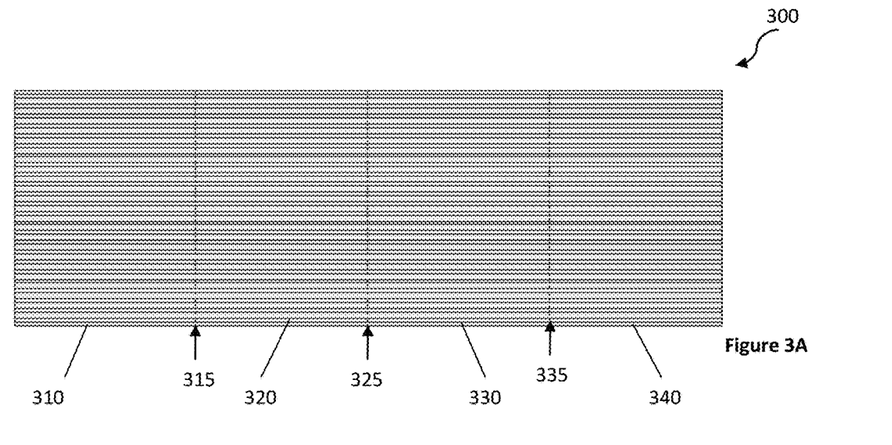
FIG. 3A illustrates a sheet of disposable protective covers separated by tear lines.
Figure 3B:
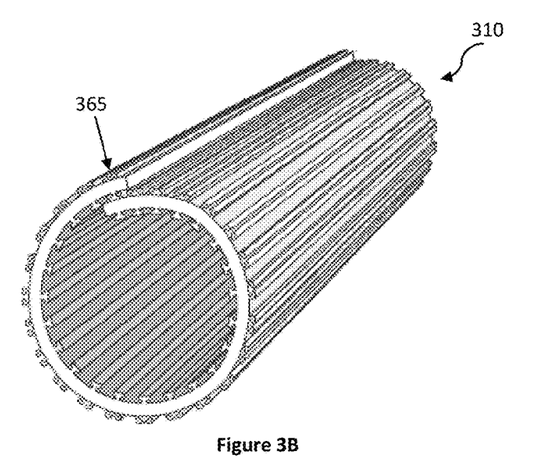
FIGS. 3B-3F illustrate a disposable protective cover separated from the sheet of FIG. 3A.
Figure 3C:
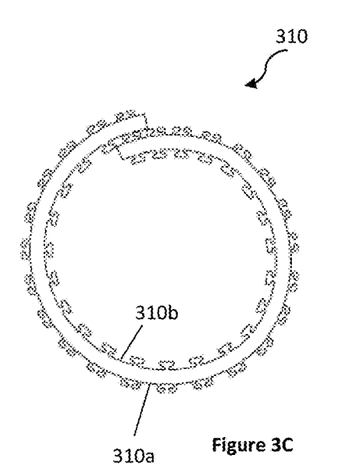
Figure 3D:
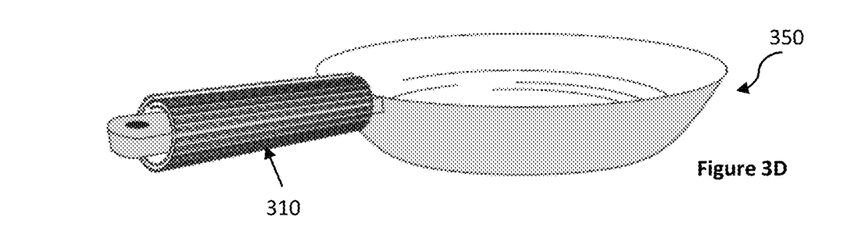
Figure 3E:
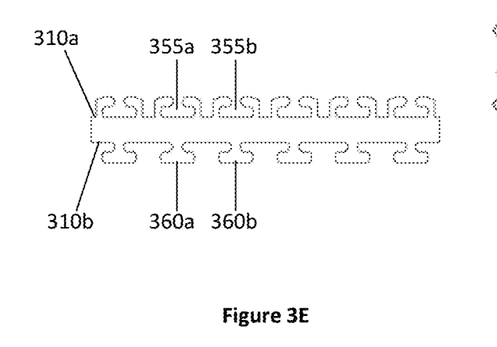
Figure 3F:
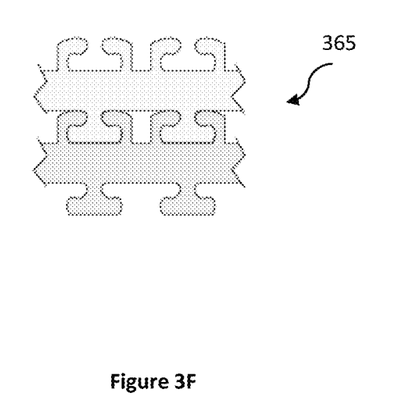

Any of the tubes described herein could conveniently be provided as a length of safety covers including multiple covers or tubes separable at tear lines. Such lengths could be beneficial for storage purposes because the safety sleeves would typically be easier to organize, stack, and locate. In FIG. 2B a length 250 of safety covers are provided. The length 250 could comprise at least 2, at least 5, at least 10 or even more safety covers or tubes 255, 260, 270, 280, which are separable at perforated tear lines 290a, 290b, and 290c. Where such lengths are provided, a user could simply tear off each safety cover (e.g., 280) prior to use. Similarly to safety covers 100 and 200, each of safety covers 255, 260, 270 and 280 could include perforated tear lines orthogonal to tear lines 290a, 290b, and 290c, which could be used to create safety shields of different sizes.

For shipping and storage convenience, covers can additionally or alternatively be provided as sheets that can be rolled up prior to use. FIGS. 3A-3F illustrate one contemplated embodiment of cover sheets 300, which include covers 310, 320, 330 and 340 separable at tear lines 315, 325 and 335. It should be appreciated that cover sheets 300 could alternatively provided as stacks of covers 310, 320, 330 and 340, which are already separated and ready to be rolled up for use.

Cover 310 includes a corrugated outer surface 310a comprising a series of female flutes, and a corrugated inner surface 310b comprising a series of male flutes. Each of the male flutes and female flutes extend along at least 10%, at least 25%, at least 50% or at least 75% of the length of cover 310's tube. As used herein, the term "corrugated" should be interpreted broadly to include any material having a series of parallel ridges or furrows (or ridges and furrows) of any suitable shape. Cover 310 can be rolled up and is size adjustable to have different diameters or widths as the male flutes can releasably couple with one or more of the female flutes, and vice versa. At overlapping region 365, one or more male flutes 360a, 360b of inner surface 310b can mate (e.g., snap) with one or more female flutes 355a, 355b of outer surface 310a to removably lock cover 300 in a rolled configuration.

Figure 4A:
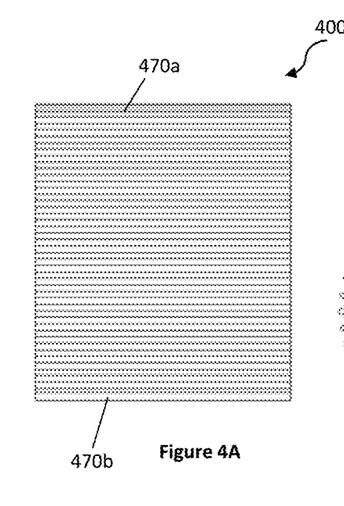
FIGS. 4A-4D illustrate a disposable protective cover including an adhesive.
Figure 4B:
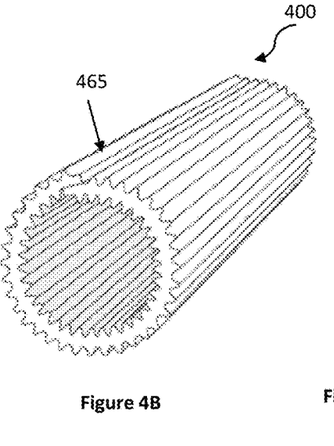
Figure 4C:
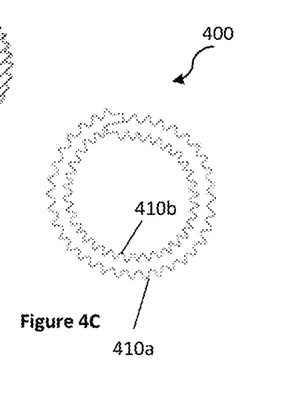
Figure 4D:
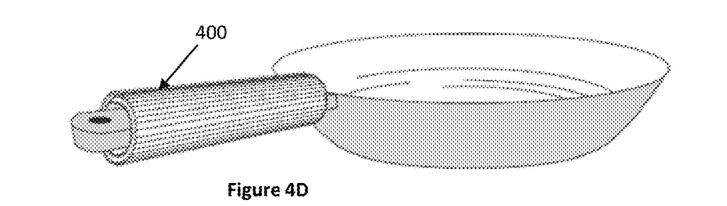
Figure 5:
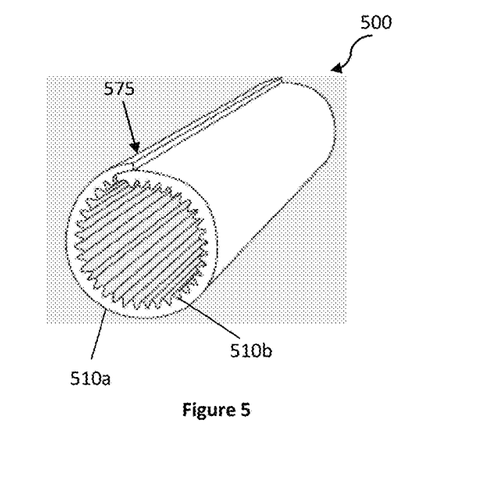
FIG. 5 illustrates a disposable protective cover similar to the cover of FIGS. 4A-4D including a smooth outer surface.

FIGS. 4A-4D illustrate another contemplated embodiment of cover sheets 400, which includes a corrugated outer surface 410a, a corrugated inner surface 410b, and an overlapping region 465 including a first fastener 470a (e.g., adhesive, hook or loop), and a second fastener 470b (e.g., an adhesion surface). As illustrated in FIG. 4D, cover sheet 400 can be rolled up for use, and fastened to itself at overlapping region 465. FIG. 5 illustrates cover 500, which is similar to cover sheet 400, but includes a smooth, non-corrugated outer surface 510a and a corrugated inner surface 510b, which are fastened to one another at overlapping region 575. Some contemplated covers can be reversible such that the corrugated surface is used as an outer surface and the non-corrugated surface is used as an inner surface. This reversibility could be accomplished simply by rolling cover 500 in a different direction (e.g., towards the outer layer, towards the inner layer). Regardless of which way cover 500 is rolled up, the first fastener (positioned similarly to 470a) will fasten with second fastener (positioned similarly to 470b) in the embodiment shown. In another contemplated embodiment, an adhesive or other fastener could be provided on an edge of the cover sheet on both outer and inner surface portions. Additionally or alternatively, an adhesion surface of other fastener could be provided on a second edge of the cover sheet on outer and inner surface portions.

Where it is desirable to have a size adjustable cover that is pre-formed or pre-rolled, it is contemplated that an elastic strip of material could be provided along a length of the cover. For example, FIGS. 6A-6H illustrates disposable protective cover 600 for hot pan handles or other objects of various sizes. Cover 600 includes an outer surface 610a, inner surface 610b, first end 620a, and second end 620b. Two tear lines 630a and 630b are provided, which allows a user to flip up an end portion of the cover to form a splatter shield 650. An elastic strip 645 is provided between first and second ends 620a and 620b which allows cover 600's diameter (or width) to adjust by at least 2%, more preferably at least 5%, at least 10%, at least 15%, or even at least 20% or more.

Figure 6A:
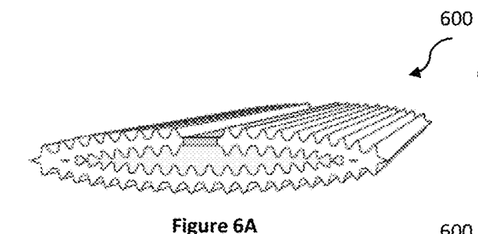
FIGS. 6A-6H illustrate a disposable protective cover having an elastic strip to accommodate different object sizes.
Figure 6B:
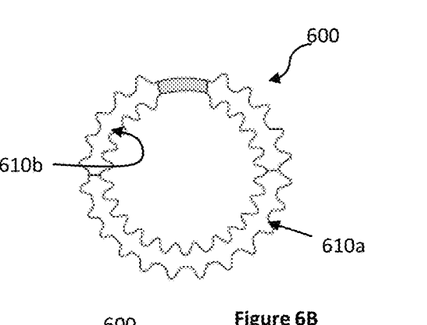
Figures 6C, 6D:
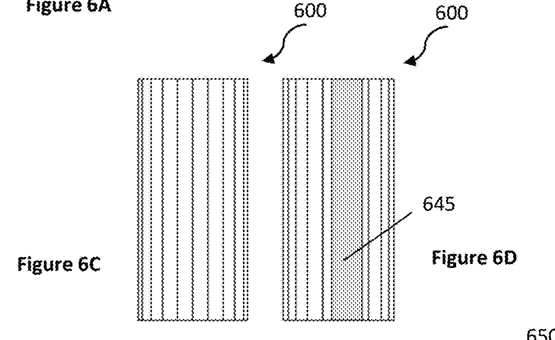
Figures 6E, 6F:
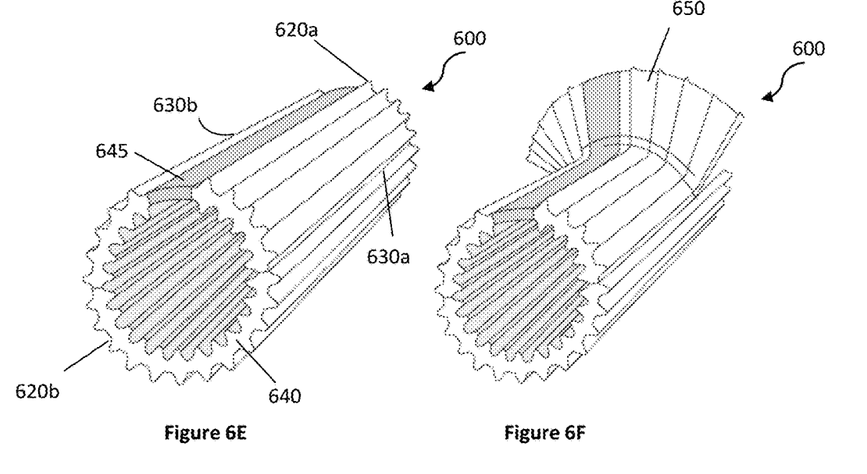
Figure 6G:
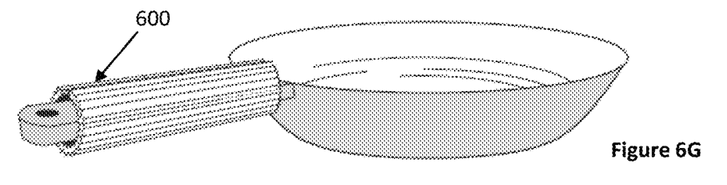
Figure 6H:
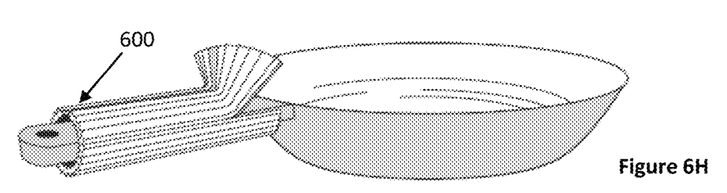

FIG. 6A illustrates cover 600 in a configuration generally preferred for shipping and storing. Cover 600 can optionally include thinned portions or fold lines that allow cover 600 to more readily be collapsed into a flatter shape. FIGS. 6B-6F illustrates cover 600 in a configuration suitable for use with a handle or other object. Cover 600 includes an opening sized and dimensioned to receive at least a portion of a handle, and is preferably sized and dimensioned to cover a portion of the handle the user would typically grab (See e.g., FIGS. 6G-6H).

The tear lines 630a and 630b could be spaced apart and of sufficient lengths such that splatter shield 650 is sized and dimensioned to prevent oil or food splatter from contacting the handle or remaining portion of cover 600. Additionally, tear lines could extend along any suitable percentage of the length of cover 600. Shield 650 will preferably extend substantially orthogonally from a non-bent portion of cover 600 and form an angle of between 60-120 degrees or between 75-105 degrees.

Elastic strip 645 could be made of any suitable material (e.g., a rubber, an elastic fabric, neoprene), and could be coupled with the corrugated paper material of cover 600 in any suitable manner (e.g., adhesive, stitching).

While elastic strip 645 is shown to extend entirely between first and second ends 620a and 620b, respectively, it is also contemplated that elastic strip 645 could be provided only across a portion of a length of cover 600 (between first and second ends), or across two or more separated portions of the length of cover 600. For example, the elastic strip 645 or strips could extend along at least 10%, at least 20%, at least 25%, at least 50%, less than 50%, less than 25%, less than 20%, less than 10%, between 10-90%, between 10-40%, between 10-30%, or between 20-40%. Furthermore, while elastic strip 650 is shown as a rectangular piece, it should be appreciated that the elastic strip 650 could comprise any suitable shape having any suitable length and width. In some preferred embodiments, the elastic strip will have a width that is less than 50%, less than 30%, less than 20% or even less than 10% of the length of the cover 600.

It should also be appreciated that adjustments to the cover's diameter could be made even where an elastic strip is not included. For example, a strip of pleated material could be provided in place of (or in addition to the) elastic strip 645, and the diameter of cover 600 could be adjusted by folding and unfolding the pleats. In some contemplated embodiments, the pleated material could comprise the same material as the rest of cover 600, but can include fewer layers so that the pleated portion can easily be folded and unfolded. For example, the pleated portion can simply comprise or consist of one or more of an outer layer, an inner layer and a mid-layer of cover 600.

Figure 7:
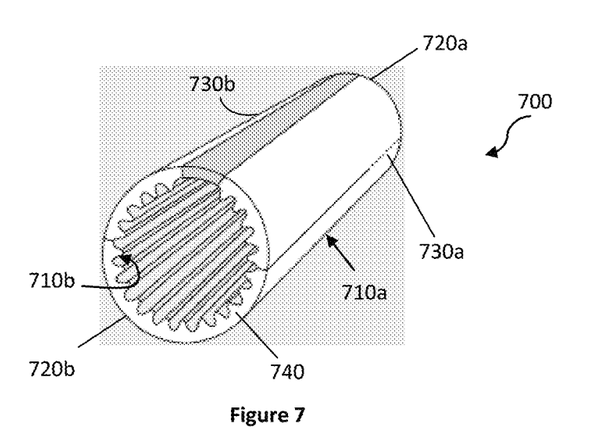
FIG. 7 illustrates a disposable protective cover similar to the cover of FIGS. 6A-6H including a smooth outer surface.

FIG. 7 illustrates another cover 700, which includes a first end 720a, second end 720b, outer surface 710a, inner surface 710b, mid-portion or mid-layer 740, and tear lines 730a and 730b. Cover 700 comprises multiple layers of material, only some of which are corrugated. The outer layer comprises a smooth outer surface 710a, while the inner layer comprises a corrugated inner surface 710b that provides for a greater grip between cover 700 and the cookware handle or other object. The mid-layer or mid-layers could additionally be corrugated to provide even more air spaces and thermal insulation. In some contemplated embodiments, a cover can comprise at least two smooth or column layers that sandwich at least one corrugated layer to form a plurality of flutes. Additionally or alternatively, flutes (or other air spaces) can be formed between the handle itself and the corrugated inner surface of the cover to prevent a transfer of heat from the handle to the outer surface of cover 700.

In order to provide additional protection against oil and food splatter from the cookware, one or more covers or caps can be provided for use with a cover of the inventive subject matter, or even with the cookware handle itself.

Figure 8:
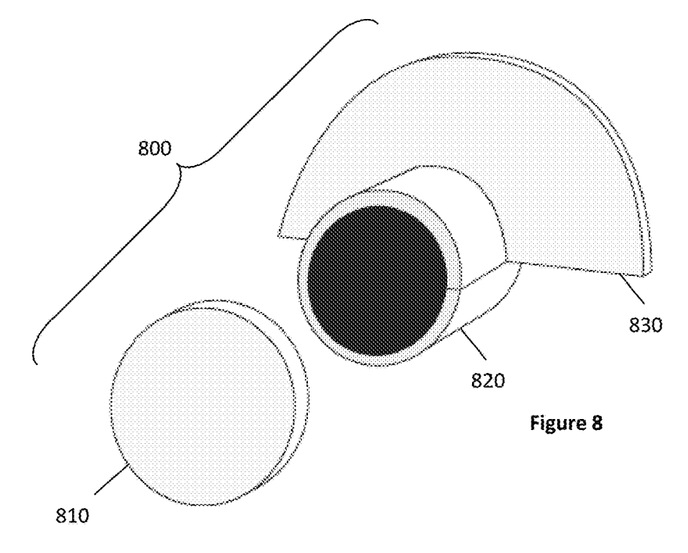
FIG. 8 illustrates end caps for use with a disposable protective cover.

For example, FIG. 8 illustrates a set of caps that can are sized and dimensioned to fit over first and second ends of any of the covers described herein, and to fit directly over a cookware handle or other object. First end cover 820 comprises two open ends and includes a splatter shield 830 that creates a 180 degrees (90-270 degrees, 150-210 degrees) shield. End cover 820 could be used in conjunction with a handle cover to protect the handle cover from grease, food or other debris. Additionally or alternatively, end cover 820 could be slid over cookware handle directly to protect the handle from grease, food or other debris. End cap 810 can be coupled to a second end of a handle cover, and assist in maintaining the cover in a rolled configuration. End caps or covers can advantageously be disposable, and can be made of any suitable material or materials (e.g., paperboard, plastic, elastic, rubber, metal, silicone, strips of hook and loop material, strips of material including hook and loop fasteners).

Figure 9A:
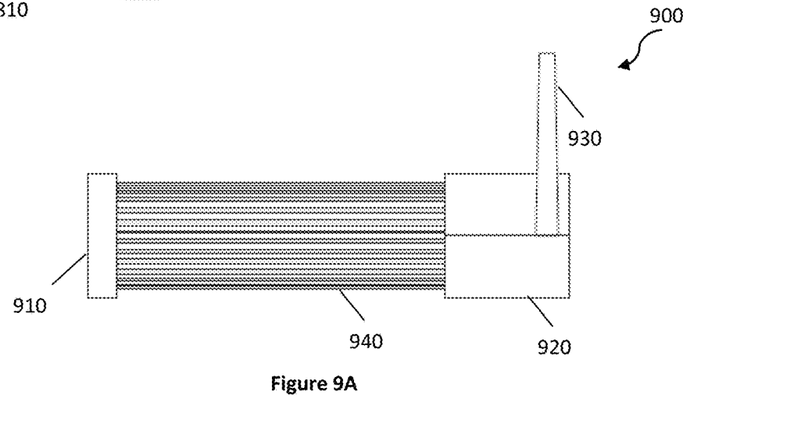
FIGS. 9A-9B illustrate a disposable protective cover including a flexible tube and end caps.
Figure 9B:
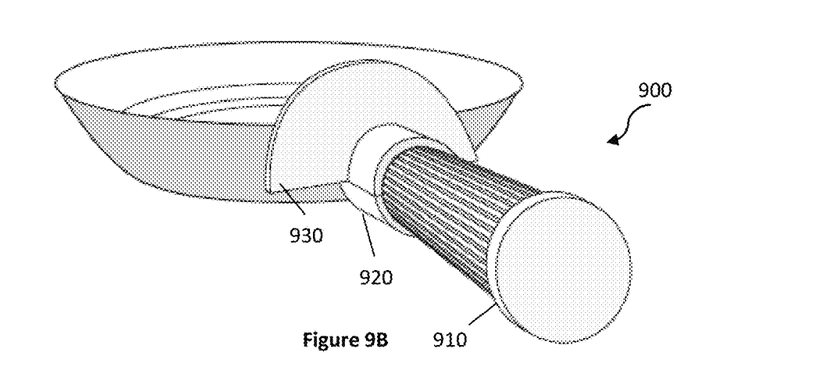

FIG. 9A-9B illustrate a disposable handle cover 900, which includes a corrugated tube 940, a first end cover 920 with splatter shield 930, and a second end cover 910. Where end covers 910 and 920 are provided, it is not necessary for tube 940 to include ends that are attached or fastened to one another via adhesives, fasteners or flutes. Instead, it is contemplated that end covers 910 and 920 could maintain the rolled configuration of tube 940 during use.

The examples herein are generally directed to handle covers having corrugated surfaces that comprise (a) male and female flutes that extend along an entire length of a tube (or at least 50%, at least 60% or at least 70% or more of a continuous length of the tube), or (b) curved or folded uniform furrows and ridges wherein the furrows and ridges have the same or substantially the same shape and size, and wherein the furrows and ridges extend along an entire length of a tube (or at least 50%, at least 60% or at least 70% or more of a continuous length of the tube). However, it should be appreciated that all commercially suitable corrugated surfaces are contemplated, as well as all commercially suitable non-smooth and non-corrugated surfaces.

Figure 10A:
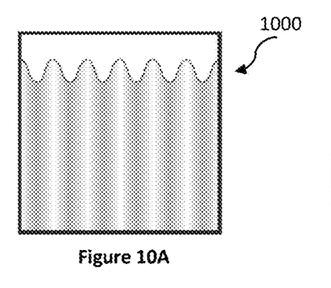
Figure 10B:
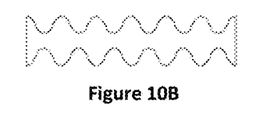
Figure 10C:
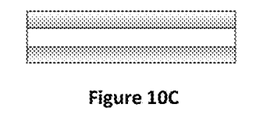
Figure 10D:
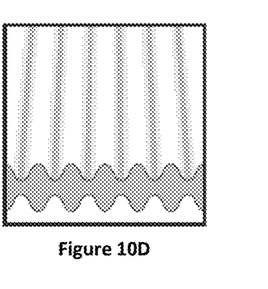

Some exemplary non-smooth surfaces that can be used to create air spaces for thermal insulation are shown in FIGS. 10A-18D. FIG. 10A illustrates a top view of a tube material comprising corrugations consisting of uniformly curved furrows and ridges that extend linearly. FIG. 10B illustrates a side view of the tube material of FIG. 10A, illustrating that outer and inner surfaces or layers are corrugated, and the outer layer's furrows align with the inner layer's furrows. FIG. 10C illustrates a cross-sectional side view of the tube material of FIG. 10A showing a cross-section that is perpendicular to the side shown in FIG. 10B. FIG. 10D illustrates a perspective view of the tube material of FIG. 10A.

Figure 11A:
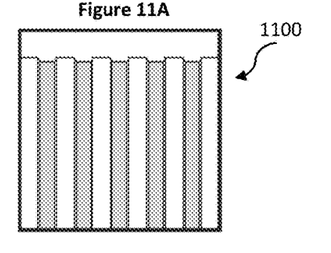
Figure 11B:
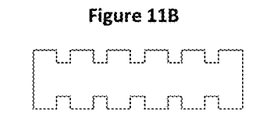
Figure 11C:
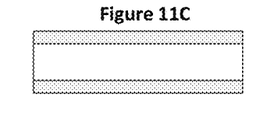
Figure 11D:
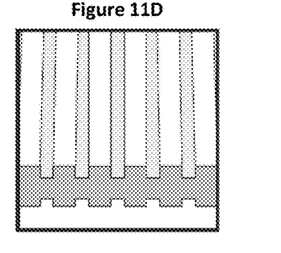

FIG. 11A illustrates a top view of a tube material comprising a series of rectangular ridges (or notches) that extend linearly across the tube material, with each ridge (or notch) having a length that is at least 200%, at least 500% and more preferably at least 1000% greater than its width. FIG. 11B illustrates a side view of the tube material of FIG. 11A, illustrating that outer and inner surfaces or layers are corrugated, and the outer layer's ridges align with the inner layer's ridges. FIG. 11C illustrates a cross-sectional side view of the tube material of FIG. 11A showing a cross-section that is perpendicular to the side shown in FIG. 11B. FIG. 11D illustrates a perspective view of the tube material of FIG. 11A.

Figure 12A:
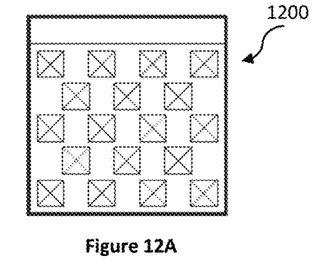
Figure 12B:
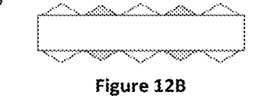
Figure 12C:
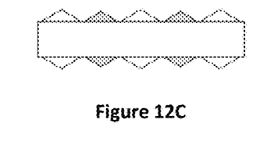
Figure 12D:
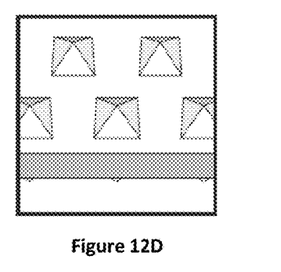

FIG. 12A illustrates a top view of a tube material comprising a series of pyramid shaped protrusions. The protrusions are positioned in rows, with each protrusion being parallel to another protrusion that is separated by an intermediate row. The protrusions of the intermediate row are not parallel to protrusions of an adjacent row. FIG. 12B illustrates a side view of the tube material of FIG. 12A, illustrating that each of the outer and inner surfaces or layers include protrusions. FIG. 12C illustrates a cross-sectional side view of the tube material of FIG. 12A showing a cross-section that is perpendicular to the side shown in FIG. 12B. FIG. 12D illustrates a perspective view of the tube material of FIG. 12A. It is contemplated that at least 20%, at least 30%, at least 40% or even at least 50% or more of at least one surface or layer of the tube material could comprise protrusions or notches.

Figure 13A:
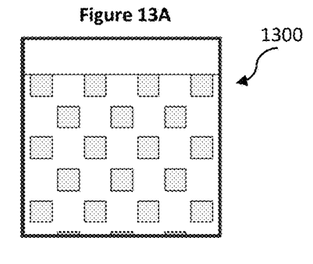
Figure 13B:
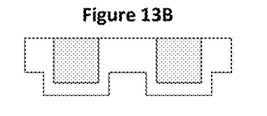
Figure 13C:
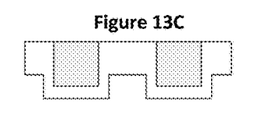
Figure 13D:
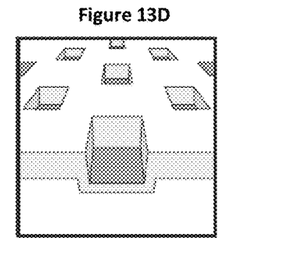

FIG. 13A illustrates a top view of a tube material comprising a series of debossed rectangles on an outer surface. The indents are positioned in rows, with each indent being parallel to another indent that is separated by an intermediate row. The indents of the intermediate row are not parallel to indents of an adjacent row. FIG. 13B illustrates a side view of the tube material of FIG. 13A, illustrating that the inner surface includes ridges or protrusions that align with (and are oversized relative to) the indents of the inner surface, and indents or furrows that align are positioned between debossed areas of the outer surface. FIG. 13C illustrates a cross-sectional side view of the tube material of FIG. 13A showing a cross section side that is perpendicular to the side shown in FIG. 13B. FIG. 13D illustrates a perspective view of the tube material of FIG. 13A.

Figure 14A:
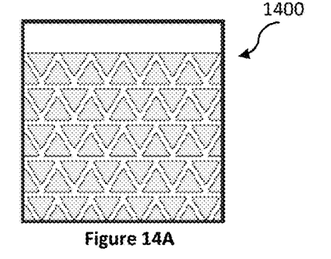
Figure 14B:
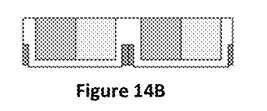
Figure 14C:
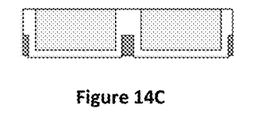
Figure 14D:
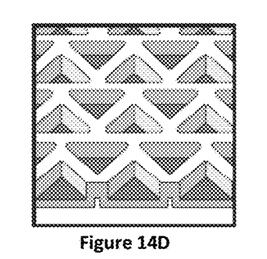

FIG. 14A illustrates a top view of a tube material comprising a series of debossed triangles on an inner or outer surface. The triangular indents are positioned in paired rows in a manner that allows for a large number of air spaces to be formed (e.g., with the triangles of a first row partially wedged between triangles of a second row). FIG. 14B illustrates a side view of the tube material of FIG. 14A, illustrating that the debossed triangles on the outer surface are embossed triangles on the inner surface, or vice versa. FIG. 14C illustrates a cross-sectional side view of the tube material of FIG. 14A showing a cross-section that is perpendicular to the side shown in FIG. 14B. FIG. 14D illustrates a perspective view of the tube material of FIG. 14A.

Figure 15A:
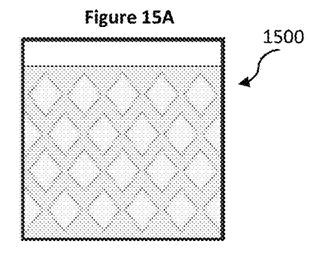
Figure 15B:
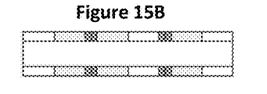
Figure 15C:
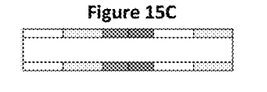
Figure 15D:
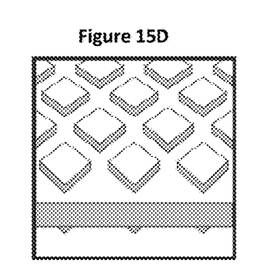

FIG. 15A illustrates a top view of a tube material comprising a series of embossed diamonds on inner and outer surfaces. The protruding areas of relief are positioned in rows in a manner that allows for a large number of air spaces to be formed (e.g., with the diamonds of a first row partially wedged between diamonds of adjacent rows). FIG. 15B illustrates a side view of the tube material of FIG. 15A. FIG. 15C illustrates a cross-sectional side view of the tube material of FIG. 15A showing a cross-section that is perpendicular to the side shown in FIG. 15B. FIG. 15D illustrates a perspective view of the tube material of FIG. 15A.

Figure 16A:
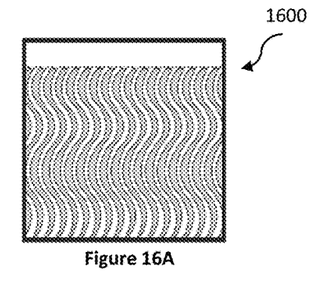
Figure 16B:
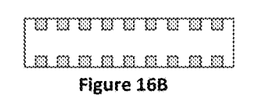
Figure 16C:
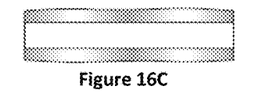
Figure 16D:
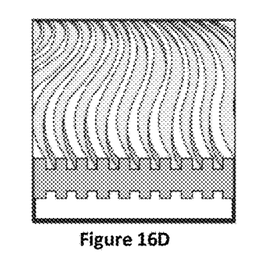

FIG. 16A illustrates a top view of a tube material comprising corrugations comprising waves of uniformly curved and sized furrows and ridges. FIG. 16B illustrates a side view of the tube material of FIG. 16A, illustrating that outer and inner surfaces or layers are corrugated, and the outer layer's furrows align with the inner layer's furrows. FIG. 16C illustrates a cross-sectional side view of the tube material of FIG. 16A showing a cross-section that is perpendicular to the side shown in FIG. 16B. FIG. 16D illustrates a perspective view of the tube material of FIG. 16A. While the waves illustrated have a generally rectangular cross-section, it should be appreciated that contemplated waves can include dome-shaped, triangular or other cross-sections.

Figure 17A:
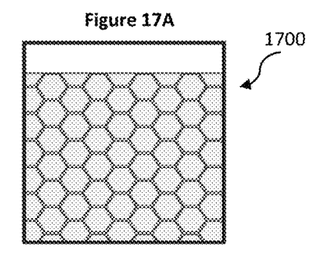
Figure 17B:
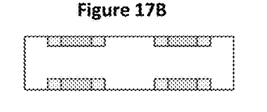
Figure 17C:
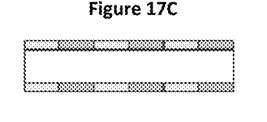
Figure 17D:
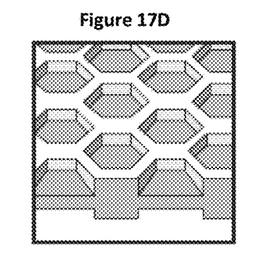

FIG. 17A illustrates a top view of a tube material comprising a series of debossed honeycombs on inner and outer surfaces. The embossed honeycombs are positioned in rows in a manner that allows for a large number of air spaces to be formed (e.g., with the honeycombs of a first row partially wedged between honeycombs of adjacent rows). FIG. 17B illustrates a side view of the tube material of FIG. 17A illustrating that outer and inner surfaces or layers include honeycombs, and the outer layer's honeycombs align with the inner layer's honeycombs. FIG. 17C illustrates a cross-sectional side view of the tube material of FIG. 17A showing a cross-section that is perpendicular to the side shown in FIG. 17B. FIG. 17D illustrates a perspective view of the tube material of FIG. 17A.

Figure 18A:
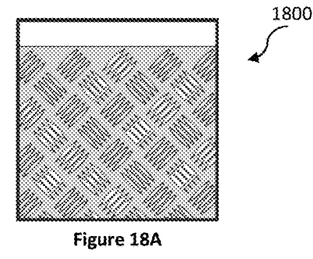
Figure 18B:
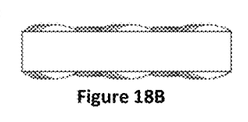
Figure 18C:
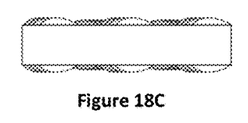
Figure 18D:
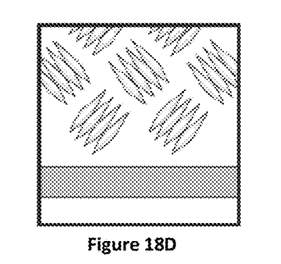

FIG. 18A illustrates a top view of an embossed hatch tube material comprising sets of embossed hatches, wherein a first set of embossed hatches extend orthogonally relative to a second set of adjacent embossed hatches. FIG. 18B illustrates a side view of the tube material of FIG. 18A showing that outer and inner layers could be embossed. FIG. 18C illustrates a cross-sectional side view of the tube material of FIG. 18A showing a cross-section that is perpendicular to the side shown in FIG. 18B. FIG. 18D illustrates a perspective view of the tube material of FIG. 18A.

Therefore, several embodiments of the inventive disposable covers have been described above. It should be apparent, however, to those skilled in the art that many more modifications besides those already described are possible without departing from the inventive concepts herein. The inventive subject matter, therefore, is not to be restricted except in the spirit of the disclosure. One skilled in the art will recognize many methods and materials similar or equivalent to those described herein, which could be used in the practice of the present invention. Indeed, the present invention is in no way limited to the methods and materials described.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range, including their endpoints. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A flat sheet of material having a length, a width, and a thickness defined by a distance between a top surface and a bottom surface, the sheet comprising:
    each of at least first, second and third perforated tear lines disposed at least part way across the width of the sheet, wherein the first tear line is distanced from the second tear line by between 2 and 8 inches, inclusive, and the second tear line is distanced from the third tear line by between 2 and 8 inches, inclusive; and
    wherein the length, width, and thickness selected such that tearing the sheet along the first, second, and third tear lines will produce at least a first section suitable to be rolled into a tube sized and dimensioned to fit around a handle of a cooking pot or pan, the thickness is at least 3 mm;
    a first pattern of first connectors on at least a first side of the first section and
    a second pattern of second connectors on at least a second side of the first section, wherein the first pattern interlocks with the second pattern.

2. The sheet of claim 1, wherein the material comprises at least 50% paper.

3. The sheet of claim 1, wherein the material comprises at least one of plastic, silicone, and rubber.

4. The sheet of claim 1, wherein at least 50% of the first side is corrugated.

5. The sheet of claim 1, wherein at least 70% of the first side is corrugated.

6. The sheet of claim 1, wherein at least some of the first connectors are disposed in a checkerboard arrangement.

7. The sheet of claim 1, wherein at least some of the first connectors are disposed in straight rows.

8. The sheet of claim 1, wherein at least some of the first connectors are disposed in wavy rows.

9. The sheet of claim 1, wherein the first pattern comprises hooks and the second pattern comprises loops.

10. The sheet of claim 1, wherein each of the first pattern comprises a series of flutes.

11. The sheet of claim 1, wherein at least the first section has an adhesive on the first side.

\* \* \* \* \*